April 21, 1925. 1,534,422
W. A. SMITH ET AL
HOLDING FIXTURE FOR ELECTRIC WELDING OF SIDE SEAMS OF CONTAINER BODIES
Filed Feb. 28, 1921 5 Sheets-Sheet 2
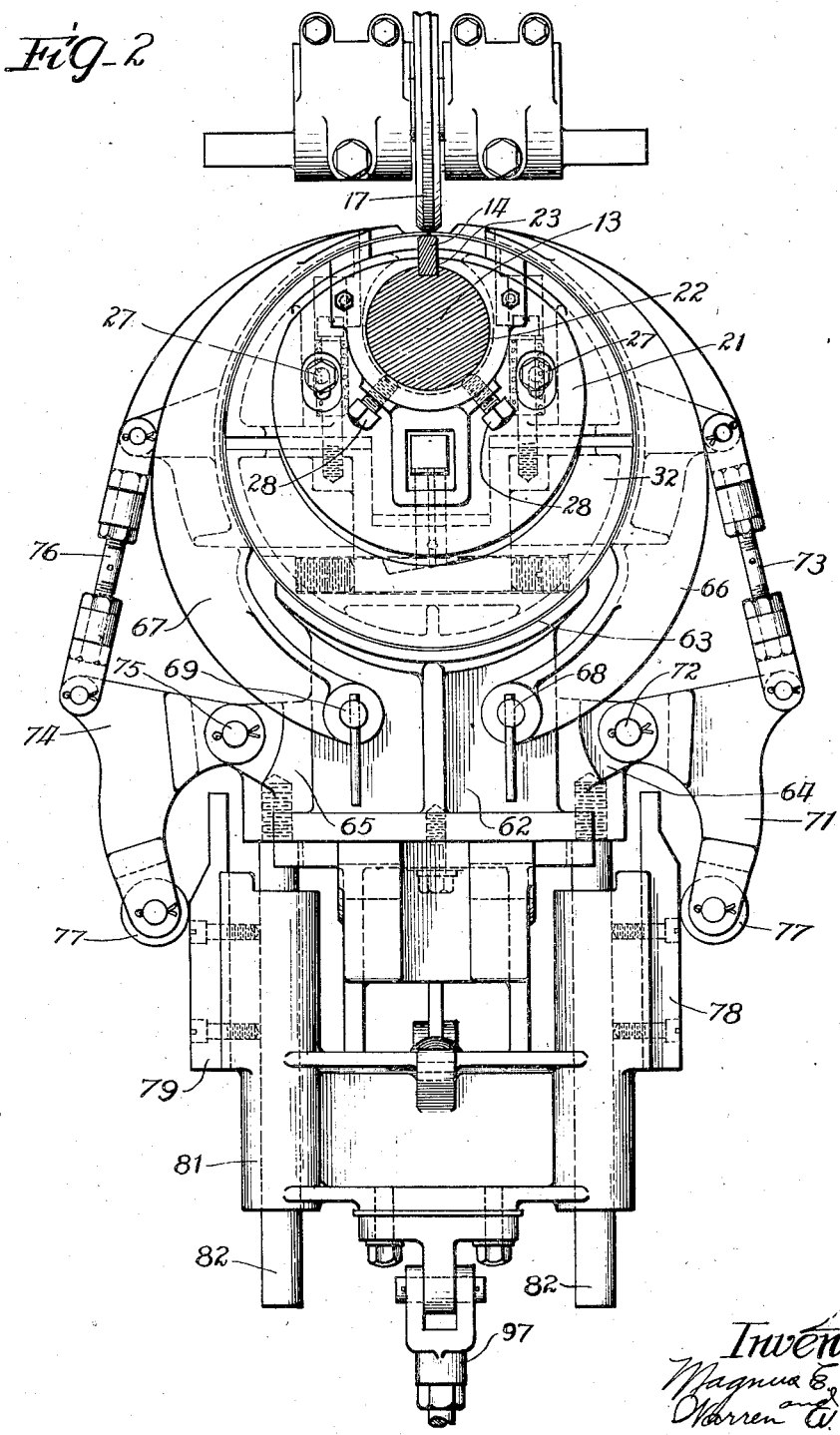

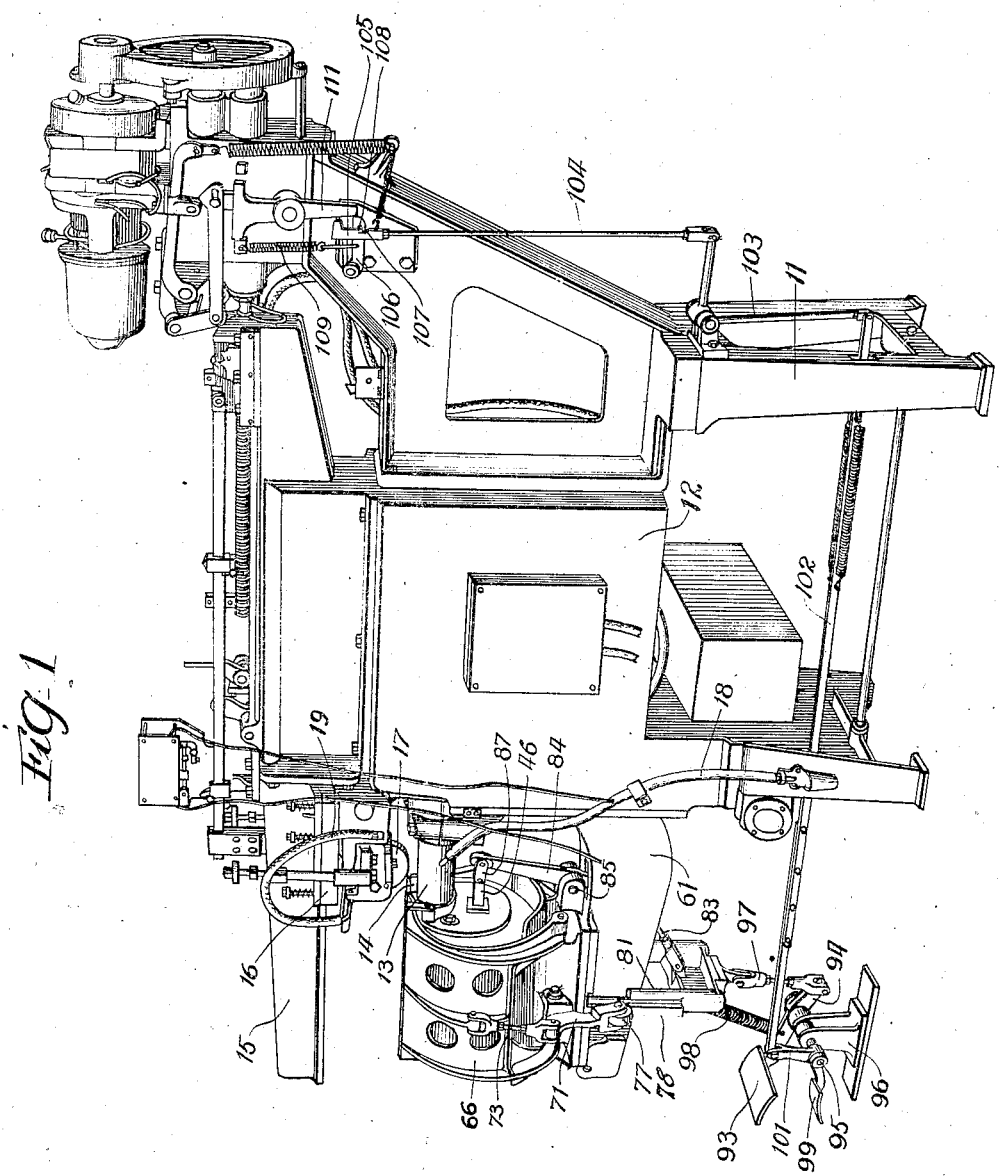

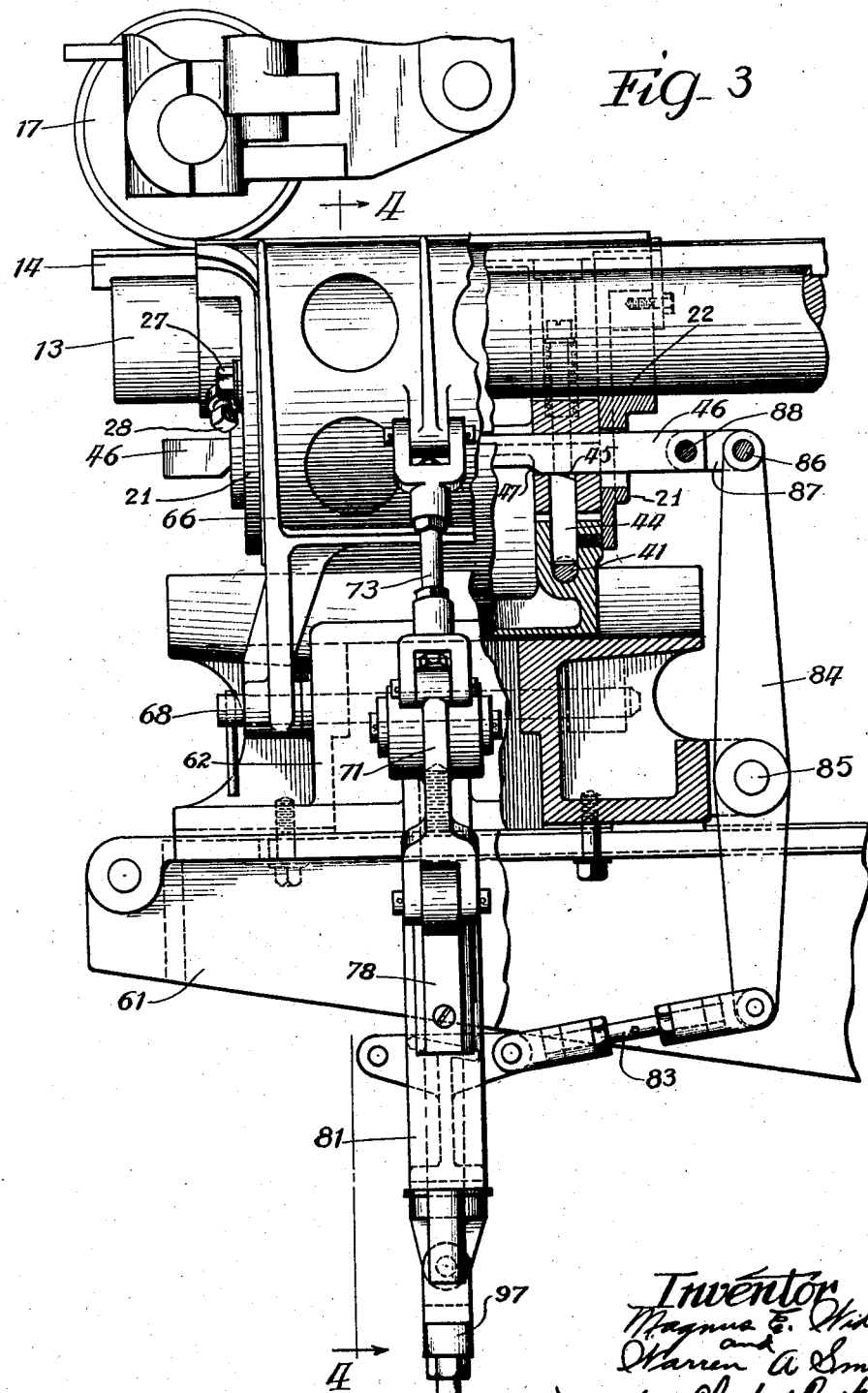

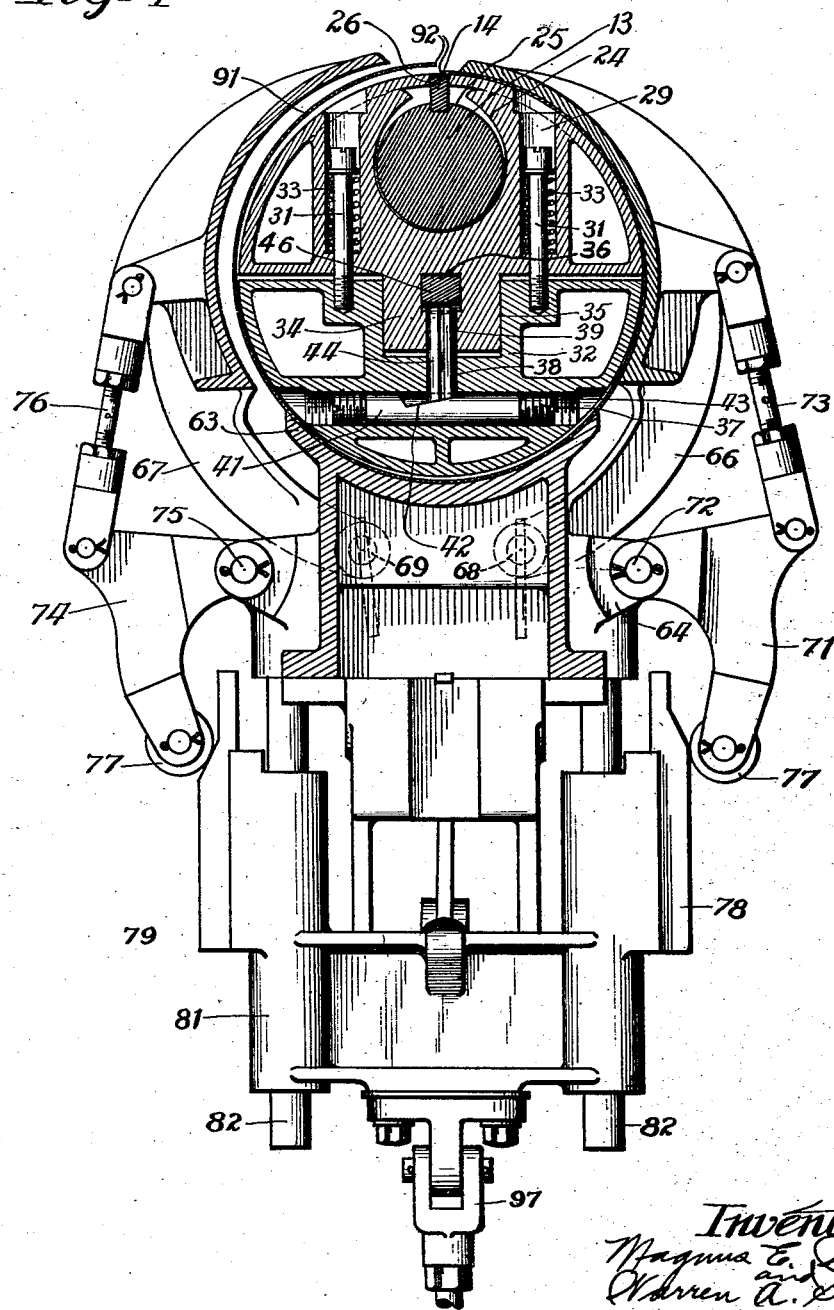

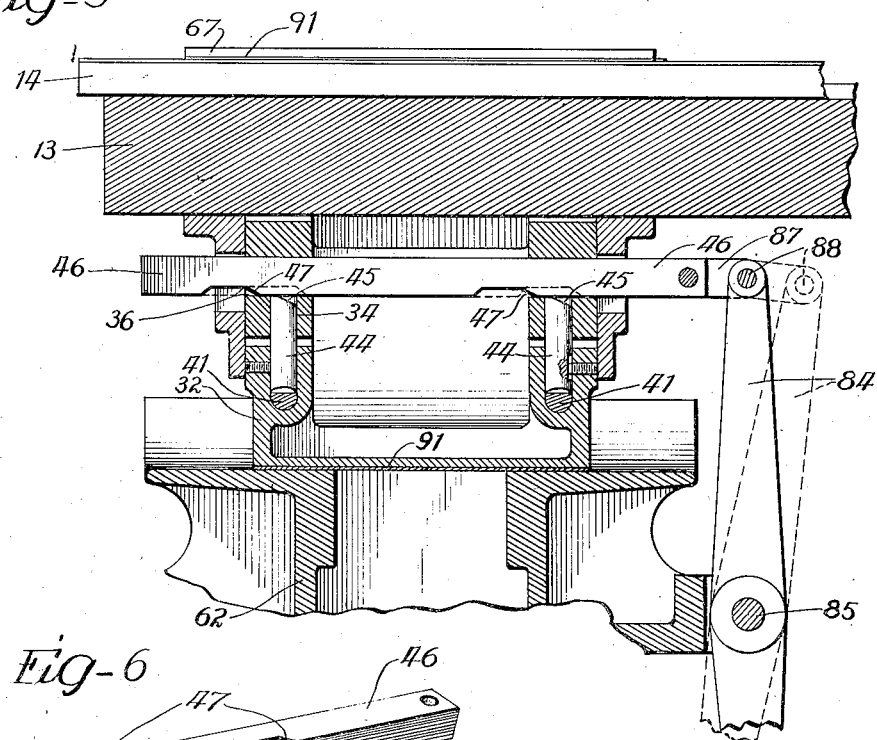
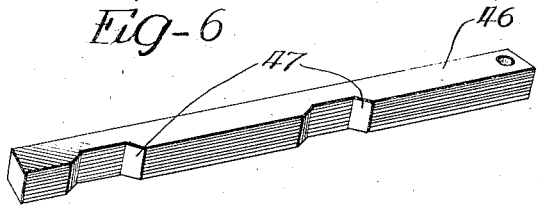
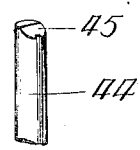
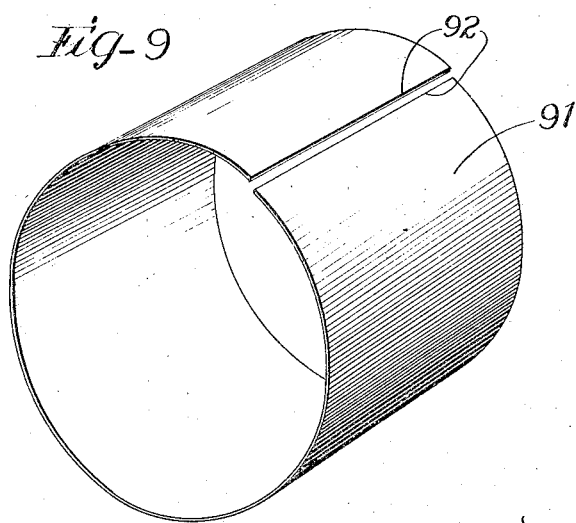
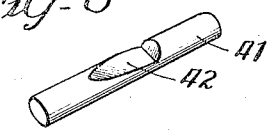

Patented Apr. 21, 1925.

1,534,422

UNITED STATES PATENT OFFICE.

WARREN A. SMITH, OF GENEVA, AND MAGNUS E. WIDELL, OF MAYWOOD, ILLINOIS, ASSIGNORS TO AMERICAN CAN COMPANY, OF NEW YORK, N. Y., A CORPORATION OF NEW JERSEY.

HOLDING FIXTURE FOR ELECTRIC WELDING OF SIDE SEAMS OF CONTAINER BODIES.

Application filed February 28, 1921. Serial No. 448,628.

*To all whom it may concern:*

Be it known that we, WARREN A. SMITH and MAGNUS E. WIDELL, citizens of the United States, residing in Geneva and Maywood, respectively, in the counties of Kane and Cook, respectively, and State of Illinois, have invented a new and useful Improvement in Holding Fixtures for Electric Welding of Side Seams of Container Bodies, of which the following is a specification.

This invention relates in general to the manufacture of cylindrical bodies and while it has more particular reference to the manufacture of container bodies in which side seams are electrically welded, it will be readily manifest that it has valuable uses in various other connections.

A principal object of the invention is the provision of means for accurately bringing the edges to be joined to form the cylindric body into proper relation. The invention contemplates in this connection the wrapping of the sheet to be formed up progressively and tightly around a former or horn.

Another important object of the invention is the provision of an arrangement bringing together automatically the edges of a sheet of metal with the nice accuracy required to permit of their being welded in an electric welder.

Other objects are,—improvements in former horns, bending wings or clamps, and in actuating and control mechanism in the described and other connections.

Another important object of the invention is the provision of a device for protecting the operator against inadvertent or illtimed actuation of the apparatus, the invention contemplating in this regard the provision of means for insuring against overlapping or inadvertent duplication of actuation. It frequently happens that in an electric welding apparatus of the character described the sheets to be formed up and welded are positioned by hand and after each welding operation it is essential that the machine become entirely inactive for at least an instant so that the operator may know that as soon as the welding members separate he may remove the body without danger of an immediately following operation of the parts.

Numerous other objects and advantages of the invention will be apparent as it is better understood from the following description, which, taken in connection with the accompanying drawings, discloses a preferred embodiment thereof.

On the drawing,

Figure 1 is a perspective view of an apparatus embodying my present invention;

Fig. 2 is an end or front elevation on an enlarged scale of a portion of said apparatus;

Fig. 3 is an enlarged partial side view thereof, parts being shown in section;

Fig. 4 is a section taken substantially on the line 4—4 of Fig. 3;

Fig. 5 is an enlarged partial front-to-back vertical section;

Fig. 6 is a perspective view of the horn extending slide member;

Fig. 7 is a perspective view of one of the vertical dogs;

Fig. 8 is a perspective view of one of the horizontal dogs; and

Fig. 9 is a perspective view of a blank adapted for insertion in the machine.

Our invention is not concerned particularly with the detailed construction of an electric welder and on this account it will not be necessary to describe in detail much of the matter shown in Fig. 1, this being provided generally for the purpose of showing the arrangement of an apparatus with which my invention is more particularly concerned. Viewing this figure, however, it will be noted that a base 11 supports a body frame 12 from the front of which extends an arbor 13 provided with a fixed electric terminal 14. Above this is arranged a track 15 on which moves a carriage 16 carrying a wheel 17 forming the movable terminal. Electric current is introduced through the two terminals (and intermediately through the edges of the blank) by any suitable arrangement, and the terminals and adjacent parts are water cooled, the pipes for this being indicated at 18 and 19. I provide a body horn of new and improved construction, comprising end circular disks 21 having openings 22 adapted to embrace the arbor 13 and slotted at the top at 23 (Fig. 2) to accommodate terminal 14. Between these end members is provided an upper fixed horn part 24 (Fig. 4) having an opening 25 for receiving the arbor and a slot 26 for receiving the terminal 14. This top horn portion is of general semi-cylindric form and is bolted at 27 between and to the end disks, bolts 28 being provided to bring the parts to tight relation (Fig. 2).

A number of shouldered openings 29 extend vertically through the upper horn part 24 and in these are mounted bolts 31 taking at their lower ends into a vertically movable or extensible horn part 32, said bolts 31 being lifted by springs 33 to normally hold the horn contracted. The upper fixed horn part 24 is provided with a central downwardly extending guide boss 34 and the lower horn part 32 is provided with a recess 35 in which the boss 34 is slidably mounted. A longitudinal channel 36, preferably of rectangular form, extends through the boss 34. Two transverse channels or openings 37 extend across through the lower portions of the horn part 32 and openings 38 and 39 provide communication between the channel 37 and the channel 36. In these various channels and openings is provided a mechanism for extending or lowering the horn part 32 as will be later described.

Into each channel 37 is positioned a horizontal dog 41 cut at its top to provide a bevel face 42, the dogs 41 being adjustable lengthwise of the opening by screw blocks 43. Upon the horizontal dogs 41 and positioned through the openings 38 and 39 are vertical dogs 44 which have beveled upper ends 45 (Fig. 5) extending up into the channel 36. In this channel is mounted a slide bar 46 (shown in detail in Fig. 6). This slide bar is provided with two notches 47 in which notches the upper ends of the dogs 44 rest when the parts are contracted. When, however, the slide bar 46 is pushed to the left (viewing Fig. 5) the dogs are depressed and being depressed carry down the horn part 32 against the force of the springs 33, and when the slide bar is moved back (as shown by dotted lines in Fig. 5) these springs contract the horn. The dog 41 is provided to permit nicety of adjustment as will be readily understood.

An arm or support 61 (Fig. 1) is arranged to extend out beneath the arbor from the front of the frame and this support carries a fixed clamping die 62 (Fig. 3) bolted to it and extending up to just beneath the horn. This clamping die has an upper face 63 (Fig. 2) curved in accordance with the curvature desired in the finished body. Lugs 64 and 65 extend out from the sides of the clamping body 62 and folding or wrapping wings 66 and 67 are pivoted respectively at 68 and 69 on the clamping body. A bell crank lever 71 is pivoted at 72 in the right hand lug 64 (viewing Fig. 2) and this bell crank is connected by a link 73 with the wrapping wing 66. A similar bell crank 74 is similarly pivoted at 75 to the left hand lug 65 and is connected by a link 76 with a wrapping wing 67. Each said bell crank 71 and 74 carries a roller 77 adapted to ride over cams 78 and 79 arranged upon the sides of a vertically movable control head 81 slidable upon bars 82 having their upper ends screwed into the die 62. The head 81 is connected by an adjustable link 83 with a lever 84 pivoted at 85 on the back of the clamping jaw body 62 and this lever is pivoted at 86 to a link 87 in turn pivoted at 88 to slide rod 46.

It is intended that the blank, indicated by reference character 91 in Fig. 9, shall be wrapped around the horn, arranging the side edges 92 in proper abutted relation for welding. To this end, said blank having been inserted in the machine, one of the wrapping wings first presses the side of the blank tightly against the outer face of the horn and immediately thereafter the expansible or movable part of the horn is brought down into forming contact with the fixed clamping jaw 62. Thereafter the other wing 67 completes the wrapping action, these agencies being so timed as to cause the blank to be tightly and progressively wrapped about the horn as a preliminary to the seam closing action. The blank is positioned with one edge upon the fixed terminal 14 and the other edge is brought over onto this terminal in proper position therewith by the wrapping. The whole wrapping action is accomplished, as will be apparent, by lifting the head 81. The wing 66 acts as described before the wing 67 because the cam 79 is lower than and acts after the cam 78. This lifting of the head results from the depressing of a foot pedal 93 (Fig. 1) upon the end of a lever 94 loose upon a shaft 95 in a base bracket 96. The lever 94 is connected by an extensible link 97 with the head 81 and a spring 98 is provided connecting the head with the lever at the opposite side of the lever fulcrum.

The foot pedal 93 is extended out at one side over the usual pedal 99 employed for starting the electrical portions of the apparatus so that when this pedal approaches its bottom position the welding begins in timed regular fashion. The lever 99 is fixed on the shaft 95 and an upstanding arm 101 is also fixed thereto. This arm is connected by a link 102 with the bell crank lever 103 at the rear of the apparatus and it in turn is connected with a link 104 extending up to a link head 105 straddling a control arm 106. The rear face of the link is provided with slots or recesses 107 adapted to be engaged by a pin 108 on the arm 106. A spring 109 normally holds the arm 106 elevated and in the path of an oscillating lever 111, movement of which makes the electric contact which starts the electrical portions of the apparatus. When the pedal 99 is depressed through the linkage mentioned, the arm 106 is pulled downwardly and the lever 111 may oscillate and in its oscillation engages the head 105 moving its slots or recesses 107 away from the pins 108. The downward movement of the head 105 has carried the arm 106 to a position somewhat beneath the lower end of the lever 111 so that when the head 105 is moved over by the lever 111 the arm 106 moves up into contact with the bottom of the lever 111 so that the pin 108 comes above the slots or recesses 107 and as will be presently understood the head 105 cannot be reengaged with the pins without lifting the foot and permitting it to rise to engaging position. The lever 111 is moved back to the position shown in Fig. 1 at the end of the welding operation. If the foot be still upon the pedal this merely permits the arm 106 to move by force of spring 109 up into normal position, i. e., the position this arm has in this figure, and nothing further happens. If it is desired to again operate the machine it is necessary then that the foot be lifted and the head 105 be permitted to raise sufficiently to re-engage the pin and pull down the arm 106 to permit repetition, such reengagement occurring after the part 111 has moved back to its normal position after a welding operation, this return of said part 111 being a known function of the electric power mechanism to which our present invention does not relate. It is therefore impossible to cause a double actuation of the machine from holding the foot pedal down longer than is necessary and it is impossible to start the machine on a cycle of operation since the lever 111 is not moved until at or near the end of the return stroke and since until this time the head 105 is held over to the left, viewing the figure, out of pin engaging position.

The blank for the container body having been shaped, positioned and held on and by the horn and its appurtenances, ready for electric welding, the latter operation may be performed by any known and suitable devices, of which those shown may be considered typical, and further description of which is not necessary to an understanding of our invention.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In an apparatus for securing together the edges of a metal sheet to form a cylindrical body, the combination of a horn upon which the edges to be joined are to be suitably arranged and means maintaining the longitudinal edges of the sheet flat and arranging an edge on said horn and progressively wrapping said sheet about said horn to bring the other edge into predetermined relation with said first mentioned edge.

2. In an apparatus for securing together the edges of a metal sheet to form a cylindrical body, the combination of a horn upon which the edges to be joined are to be suitably arranged and means maintaining the longitudinal edges of the sheet flat and arranging an edge on said horn and progressively wrapping said sheet about said horn to bring the other edge into proper relation with and edgewise abutment against said first mentioned edge, said means progressively clamping said sheet as it is wrapped.

3. In an apparatus for securing together the edges of a metal sheet to form a cylindrical body, the combination of a horn and a pair of wrapping wings successively operable, one wing wrapping one side of said sheet to the horn and clamping and the other wing then wrapping the other side to bring the edges in proper relation and endwise abutment against each other.

4. An apparatus for securing together the edges of a metal sheet to form a cylindrical body, the combination of a horn and a pair of wrapping wings successively operable, one wing wrapping one side of said sheet to the horn and clamping the same on the horn and the other wing then wrapping the other side to bring the edges in proper relation, and an intermediate member wrapping the center portion of said sheet, and welding means cooperating with said wrapping devices.

5. In an apparatus for securing together the edges of a metal sheet to form a cylindrical body, the combination of a horn and a pair of wrapping wings successively operable, one wing wrapping one side of said sheet to the horn and clamping the same on the horn and the other wing then wrapping the other side to bring the edges in proper relation, and an intermediate member wrapping the center portion of said sheet and operable between the wrapping actions of said wings, and welding means cooperating with said wrapping devices.

6. In an apparatus for securing together the edges of a metal sheet to form a cylindrical body, the combination of a horn having an extensible part, a fixed wrapping member therebeneath, means holding one edge of a sheet to be formed into a body, and means actuating said extensible part to extend it while said edge is held and the other edge free to produce a wrapping action, and welding means cooperating with said wrapping devices.

7. In an apparatus for securing together the edges of a metal sheet to form a cylindrical body, the combination of a horn having a stationary top part, and a vertically movable bottom part, a pair of wrapping wings successively operable, a clamping member beneath said horn, and means operating first one wing at one side of said sheet to clamp one side to the sheet then moving said horn part downwardly against said fixed clamping member to wrap the center of the sheet and then moving inward the other wing to complete the wrapping action.

8. In an apparatus for electrically welding the edges of a metal sheet to form a cylindrical body, the combination of a horn carrying a fixed terminal, a companion movable terminal, wrapping means for wrapping a sheet about said horn and starting with an edge laid upon said fixed terminal and bringing the other edge into welding relation therewith.

9. In an apparatus for electrically welding the edges of a metal sheet to form a cylindrical body, in combination, a horn comprising a fixed terminal, a movable terminal cooperating therewith, said horn having an extensible body, a curved clamping member co-operating therewith, and wrapping wings located on opposite sides of said clamping member, one of said wings acting in advance of the clamping of the sheet between said clamping member and said horn, and the other wing acting subsequently thereto, whereby to wrap the sheet progressively about said horn and bring the edges into welding relation.

10. In an apparatus for electrically welding the edges of a metal sheet to form a cylindrical body, in combination, a horn comprising a fixed terminal, a movable terminal co-operating therewith, said horn having an extensible body, a curved clamping member co-operating therewith, and wrapping wings located on opposite sides of said clamping member, one of said wings acting in advance of the clamping of the sheet between said clamping member and said horn, and the other wing acting subsequently thereto, whereby to wrap the sheet progressively about said horn and bring the edges into welding relation, and a vertically movable member for actuating said wings and said horn.

11. An attachment for an electric welding apparatus, having an arbor provided with a fixed terminal and a movable terminal co-operating therewith, said attachment comprising a horn body adapted to receive said arbor in eccentric relation to the horn body, and means progressively wrapping a sheet of metal to be welded into a cylindrical body about said horn.

12. In an electrical welding apparatus, the combination of fixed and movable terminals, power mechanism for moving said movable terminal into electric welding relation with said fixed terminal, and a control for said power mechanism, said control comprising members automatically disengaged upon the initial action of said power mechanism and until the welding action is completed.

WARREN A. SMITH.
MAGNUS E. WIDELL.